S. H. BINGMAN.
Harvester Rake.

No. 99,820.

Patented Feb. 15, 1870.

Witnesses
P. J. Brown
G. A. Hardaners

Inventor
Samuel H. Bingman,
By his atty.
J. S. Brown

United States Patent Office.

SAMUEL H. BINGMAN, OF LAURELTON, PENNSYLVANIA.

Letters Patent No. 99,820, dated February 15, 1870.

IMPROVEMENT IN COMBINED REEL AND RAKE FOR HARVESTERS.

The Schedule referred to in these Letters Patent and making part of the same.

*To all whom it may concern:*

Be it known that I, SAMUEL H. BINGMAN, of Laurelton, in the county of Union, and State of Pennsylvania, have invented an improved Self-Acting Reel and Rake for Harvesters; and I do hereby declare that the following is a full and exact description thereof, reference being had to the accompanying drawings making part of this specification.

Figure 1:
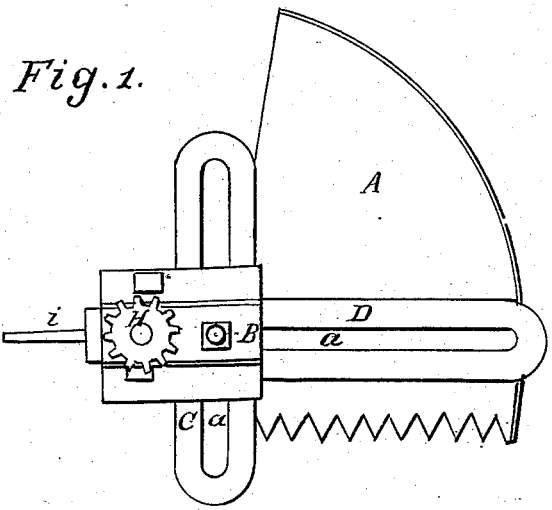

Figure 1 is a plan of a harvester platform, together with my improved reel and rake and the working parts connected therewith.

Figure 2:
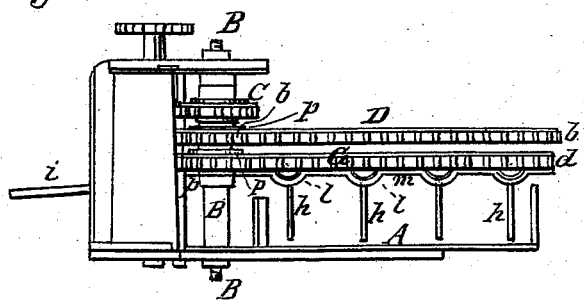

Figure 2, a front elevation of the same.

Figure 3:
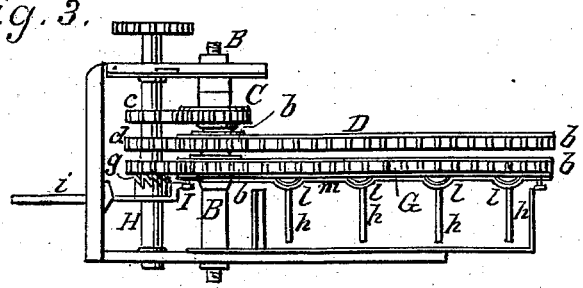

Figure 3, a similar elevation, the housing being removed to show the working parts more completely.

Figure 4:
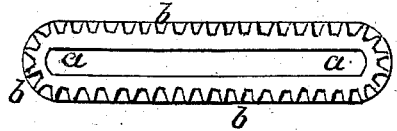

Figure 4, a view of the under side of a reel or rake-head.

Like letters designate corresponding parts in all of the figures.

Letter A represents a harvester platform.

Near the front inner corner thereof is mounted a vertical shaft, B, upon or around which operate the reel or reels C D, (one, two, or more,) and the rake G.

Each reel as well as the head of the rake being of sufficient length to reach across the harvester platform, is provided with a central slot, $a$, extending nearly its whole length, and of uniform width, just sufficient to embrace the shaft B. Around the entire outer edge or periphery thereof, which is semicircular at the two ends, is a rack, $b$, which gears into a pinion on a vertical driving shaft, H, situated at the proper distance from the shaft B.

Each reel and rake, C, D, and G, respectively, has a pinion, $c$, $d$, and $g$, on the said driving shaft, the situation of which is laterally opposite to the shaft B, so that, on communicating the proper motion to the driving shaft in any suitable way from the driving wheels of the harvester, the motion of the reels and rake will be first directly and longitudinally forward their whole length into the standing grain, while the pinions are in gear with the side racks thereof, and then they will make a quick sweep backward over the harvester platform, through a half circle, when the pinions reach the semicircular end racks thereof, the reels bringing the standing grain back over the platform, while the rake, which is below the reels, sweeps the cut grain from the said platform. Then the other end of each reel and rake goes forward, repeating the movement.

The reels are so arranged, if there are only two, as to alternate in action, one, as C, fig. 1, being half way in its forward movement, while the other, as D, fig. 1, is in the middle of its semicircular turning movement.

The pinion $g$, which drives the rake G, is loose on the driving shaft H, and a clutch, I, is provided, so that, by depressing a lever, $i$, it will engage with the pinion, and couple the same to the shaft.

Thus, after each movement of the rake, its pinion, $g$, is uncoupled, and does not turn with the driving shaft, so that the rake remains stationary till enough cut grain has accumulated on the platform to form a gavel, when the lever $i$ is depressed by the driver, and by coupling the pinion $g$ to the driving shaft, the rake is given a movement to sweep the gavel from the platform.

The rake-teeth $h\,h$ are suspended by semi-cylindrical heads $l\,l$, reaching transversely across the rake-head, and resting in sockets of similar form in a supporting bar, $m$, suspended with a slight play from the rake-head.

The design of the construction is to have the bar $m$ pressed, by suitable means, upward to the rake-head, so as to hold the rake-teeth rigid while the rake is in operation; but to let the bar down so as to leave the teeth to yield to obstructions when the rake is stationary on the machine, any convenient and suitable means may be employed for giving alternate rigidity and looseness to the rake-teeth, as required.

The reels and rake are supported upon and between proper washers and shoulders, $p\,p\,p$, on the shaft B, to hold them at the right height and in horizontal positions at all times.

What I claim as my invention, and desire to secure by Letters Patent, is—

1. The reels C D and rake G, having central oblong slots $a\,a\,a$ to embrace a guide-shaft, B, and continuous edge racks $b\,b\,b$ which gear into pinions $c$, $d$, and $g$ on a driving shaft, H, so as to operate substantially as and for the purpose herein specified.

2. In combination with the rake G, constructed and operating as described, the clutch I, as and for the purpose set forth.

3. The combination and arrangement of the reels C D, rake G, shaft B, pinions $c\,d\,g$, driving shaft H, and clutch I, substantially as herein set forth.

Specification signed by me, December 28, 1869.

SAMUEL H. BINGMAN.

Witnesses:
D. K. HURST,
WM. JONES,
SAMUEL SLIFER.